(12) United States Patent
Bergholtz et al.

(10) Patent No.: US 9,108,490 B2
(45) Date of Patent: Aug. 18, 2015

(54) AIR SUPPLY DUCT

(75) Inventors: Nathalie Bergholtz, Vaestra Froelunda (SE); Christer Olsson, Kinna (SE); Goeran Nyman, Gothenburg (SE); Stefan Groesfjeld, Hisings Kaerra (SE)

(73) Assignee: VOLVO CAR CORPORATION (SE)

( * ) Notice: Subject to any disclaimer, the term of this patent is extended or adjusted under 35 U.S.C. 154(b) by 790 days.

(21) Appl. No.: 13/354,816

(22) Filed: Jan. 20, 2012

(65) Prior Publication Data

US 2012/0187723 A1  Jul. 26, 2012

(30) Foreign Application Priority Data

Jan. 21, 2011  (EP) .................................. 11151664

(51) Int. Cl.
*B60H 1/30* (2006.01)
*B60H 1/28* (2006.01)
*B62D 25/08* (2006.01)

(52) U.S. Cl.
CPC .............. *B60H 1/28* (2013.01); *B62D 25/081* (2013.01)

(58) Field of Classification Search
CPC .......... B60H 1/26; B60H 1/28; B62D 25/081
USPC ......................................... 454/147; 296/192
See application file for complete search history.

(56) References Cited

U.S. PATENT DOCUMENTS

| | | | |
|---|---|---|---|
| 3,638,551 A * | 2/1972 | Morchen et al. | 454/146 |
| 4,437,393 A * | 3/1984 | Stolz et al. | 454/147 |
| 4,601,510 A * | 7/1986 | Schoppel et al. | 296/203.02 |
| 5,139,458 A * | 8/1992 | Koukal et al. | 454/147 |
| 5,145,457 A * | 9/1992 | Tanigaito et al. | 454/147 |

(Continued)

FOREIGN PATENT DOCUMENTS

| | | |
|---|---|---|
| DE | 43 03 633 C1 | 3/1994 |
| DE | 197 34 146 A1 | 2/1999 |

(Continued)

OTHER PUBLICATIONS

European Search Report Dated Jun. 14, 2011, Applicant Volvo Car Corporation, Application No. 11151664.7-2423—6 Pages.

*Primary Examiner* — Steven B McAllister
*Assistant Examiner* — Jonathan Cotov
(74) *Attorney, Agent, or Firm* — Brooks Kushman P.C.

(57) ABSTRACT

The present disclosure relates to an air supply duct for a vehicle, the air supply duct comprising a housing, the housing having an inlet adapted to receive air from outside of the vehicle and an outlet adapted to convey the air to a vehicle climate control system, and a cowl arranged inside the housing, the cowl being adapted to direct the air along an air path, such that the air path changes direction within the housing. The cowl has a curved form adapted to form an inner curve of the air path. Further, the cowl comprises a precipitation collection means arranged to collect precipitation borne by the air from the outside of the vehicle and to remove the precipitation from the air. The disclosure also relates to a vehicle comprising such an air supply duct.

17 Claims, 3 Drawing Sheets

(56) References Cited

U.S. PATENT DOCUMENTS

| | | | | |
|---|---|---|---|---|
| 5,277,656 A | * | 1/1994 | Koukal et al. | 454/147 |
| 5,679,074 A | * | 10/1997 | Siegel | 454/147 |
| 5,692,953 A | * | 12/1997 | Bell et al. | 454/146 |
| 6,322,440 B1 | * | 11/2001 | Nakatani | 454/147 |
| 6,902,595 B2 | * | 6/2005 | Darnell | 55/396 |
| 7,197,885 B2 | * | 4/2007 | Kozak et al. | 62/93 |
| 7,976,097 B2 | * | 7/2011 | Watanabe et al. | 296/192 |
| 2003/0107243 A1 | * | 6/2003 | Hayashi | 296/192 |
| 2006/0048986 A1 | * | 3/2006 | Bracciano | 180/69.2 |
| 2008/0246311 A1 | * | 10/2008 | Hagino et al. | 296/192 |
| 2010/0051712 A1 | * | 3/2010 | Lebeck | 237/12.3 A |

FOREIGN PATENT DOCUMENTS

| | | |
|---|---|---|
| DE | 199 23 193 C1 | 7/2000 |
| DE | 19923193 C1 * | 7/2000 |
| DE | 102 37 235 B3 | 5/2004 |
| DE | 103 41 129 B3 | 2/2005 |
| EP | 1642755 A2 | 4/2006 |

* cited by examiner

AIR SUPPLY DUCT

CROSS-REFERENCE TO RELATED APPLICATIONS

This application claims foreign priority benefits under 35 U.S.C. §119(a)-(d) to EP 11151664.7, filed Jan. 21, 2011, the disclosure of which is hereby incorporated by reference in its entirety.

TECHNICAL FIELD

The present disclosure relates to an air supply duct for a vehicle, and to a vehicle comprising such an air supply duct.

BACKGROUND

Many modern vehicles are provided with a climate control system, e.g., an HVAC system, i.e., a heating, ventilation and air conditioning system, in order to provide a comfortable climate in the passenger compartment. Typically, fresh air is supplied to the climate control system from ambient air outside of the vehicle through an air supply duct.

Sometimes, precipitation, such as rain, snow or hail, may be present in the outside air and may also further be borne by the air into the air supply duct. However, this is undesirable since if moist or water enters the climate control system, there is a risk of bad smell arising or water entering the passenger compartment. Moreover, the precipitation may reduce the efficiency of the climate control system and there may even be a risk of damaging the climate control system. There is therefore a wish to at least partly prevent precipitation from entering the climate control system of the vehicle.

Patent document DE 103 41 129 B3 discloses an air supply duct for a vehicle. A gap is provided between the bonnet and the windscreen, through which fresh air can enter the air supply duct. The air supply duct has an air inlet aperture leading to a water collection cavity. A water retaining wall may be provided in the aperture.

However, even if the water retaining wall can prevent flowing water from entering into the air supply duct, there is still a risk that precipitation, e.g., in the form of water droplets, may be carried by the air further into the air supply duct. Moreover, such a water retaining wall may create a pressure drop for the air, which counteracts the air flow requirements for the climate control system.

There is therefore a need for an improved air supply duct.

SUMMARY

An object of the present disclosure is to overcome or ameliorate at least one of the disadvantages of the prior art, or to provide a useful alternative.

It is desirable to provide an air supply duct being able to at least partly collect precipitation borne by the air and thereby prevent the precipitation from entering further into the air supply duct and eventually reaching the climate control system.

In a first aspect of the present disclosure there is provided an air supply duct for a vehicle, the air supply duct comprising a housing having an inlet adapted to receive air from outside of the vehicle and an outlet adapted to convey the air to a vehicle climate control system. The air supply duct further comprises a cowl arranged inside the housing and being adapted to direct the air along an air path such that the air path changes direction within the housing. The cowl has a curved form adapted to form an inner curve of the air path, and the cowl comprises a precipitation collection means or device arranged to collect precipitation borne by the air from the outside of the vehicle and to remove the precipitation from the air.

The air taken from outside of the vehicle is used to supply the climate control system with fresh air. The curved form of the cowl is adapted to obtain an appropriate flow path for the air through the air supply duct. The cowl forms an inner curve, i.e., the flow path along the cowl is shorter than the flow path along walls of the housing. Since the cowl comprises the precipitation collection means, this results in that the precipitation collection means also is arranged at the inner curve. This arrangement of the precipitation collection means is advantageous, since it can stop water flowing along the cowl from entering further into the air supply duct.

Since precipitation is separated from the air entering into the passenger compartment of the vehicle, less moisture is transported into the passenger compartment. This may result in reduced problems with misted windshield and windows in the vehicle.

In conventional air supply ducts there is a trade-off between the desire to have a short air path, thereby lowering the heat pick up on the way through the air supply duct, and the desire to have a long air path, thereby improving the separation of water droplets from the air. Unlike these, the air supply duct according to the present disclosure may be built in a compact manner, resulting in a short air path through the air supply duct. Thus, in a preferred embodiment of the disclosure, the inlet of the air supply duct (corresponding to the air inlet of the vehicle) may be located in the vicinity of the outlet of the air supply duct (corresponding to the inlet of the climate control system/HVAC), whereby a curved form of the air supply duct may direct the air along an air path from said inlet to said outlet at the same time as precipitation may be separated. More preferably, the inlet of the air supply duct may be located above the outlet of the air supply duct in a vertical direction so that precipitation may be separated when the air travels along said curved air path. In this way the separation of the precipitation is obtained by means of the gravity thereof. The air supply duct according to the disclosure thus offers a solution in which precipitation may be appropriately separated and yet the heat pick up is kept to an acceptable level.

The housing of the air supply duct according to the present disclosure may form a separate unit which may be sealed from the engine compartment of the vehicle. Thereby, no air may leak from the engine compartment into the air supply duct. This is beneficial from an energy point of view, since air coming from the engine compartment would, assuming a warm engine, have a higher temperature than the outside air. Therefore, in operating conditions of the climate control system, when there is a need to cool the air to provide a comfortable climate in the passenger compartment, warm air from the engine compartment would result in a need for additional cooling, which consumes energy. However, with the air supply duct according to the disclosure, substantially no air can leak from the engine compartment and thus such additional cooling can be avoided. In particular, the temperature level triggering the air conditioning to start may be raised by avoiding leakage of warm air into the air supply duct.

The air supply duct according to the disclosure is hence advantageous from an energy point of view, as compared to a conventional air supply duct. Therefore the air conditioning may start working at a higher ambient temperature than when used with a conventional air supply duct. Purely as an example, the air conditioning may start working at an ambient temperature of 20-25° C. instead of a temperature of 10-15° C. when used with a conventional air supply duct.

In an embodiment of the air supply duct, the curved form of the cowl comprises a first region which is substantially horizontal when mounted in the vehicle. Preferably, the first region is close to the inlet of the air supply duct.

The curved form of the cowl may further comprise a second region which is substantially vertical when mounted in the vehicle. Moreover, the curved form of the cowl may form a smooth transition between the first and second regions.

In an embodiment, the cowl changes the air path by about 180 degrees when passing a first edge of the cowl. The first edge may be a lower edge of the cowl. In the case that the cowl has a second vertical region, as described above, the first edge may be at the end of the second vertical region and may change the air path from essentially vertically downwards to essentially vertically upwards.

The inlet may be covered by a hole structure, such as a perforated plate or a net to prevent external objects from entering the air supply duct. The hole structure may comprise holes with any geometrical shape, such as round, elliptic, square, rectangular, hexagonal and/or S-formed shapes or combinations thereof. Alternatively, the inlet may be completely open, thereby allowing a higher air flow.

The housing may have a drainage opening at its lower region, e.g, at or close to its lowest point, when mounted in a vehicle. Preferably, the drainage opening comprises a non-return valve which is arranged to let precipitation, e.g., water, pass outwards from the air supply duct, but to prevent water and/or polluted air from entering therethrough into the air supply duct. Alternatively, the drainage opening may lead to a duct, the other end of which ends at a position in the vehicle having no warm air and/or no presence of exhaust gas, thereby further reducing any risk of warm or polluted air entering the air supply duct.

The precipitation collection means may be arranged along at least a portion of the first edge of the cowl. The first edge may form a lower edge of the cowl. Preferably, the precipitation collection means is arranged along substantially the whole first edge.

The precipitation collection means may form an integral part of the cowl. Purely as an example, the cowl may be made of moulded plastics and in that case the cowl and the precipitation collection means may be moulded at the same time and in the same tool. Alternatively, the precipitation collection means may be a separate part mounted to the cowl.

In an embodiment the precipitation collection means forms a gutter along at least a portion of a lower edge of the cowl. The lower edge may be formed by the first edge of the cowl. In such a case, the gutter may be formed along the edge of the cowl which also changes the air path by about 180 degrees when the air passes the edge.

The precipitation collection means may be inclined in relation to a horizontal plane when the air supply duct is mounted in the vehicle. Thereby the precipitation collection means becomes self-emptying, since the water will flow towards the lowest point. A drainage duct may be connected to the lowest point of the precipitation collection means. Preferably, the drainage duct in that case comprises a non-return valve which is arranged to let precipitation, e.g. water, pass outwards from the precipitation collection means, but to prevent water and/or polluted air from entering therethrough into the air supply duct.

In a second aspect of the present disclosure there is provided a vehicle comprising an air supply duct as described above.

The inlet of the air supply duct may be located in a plenum area or in a bonnet of the vehicle. The air supply duct may be arranged in the vicinity of the windshield, where it is relatively close to the ducts of the climate control system.

Further, the air supply duct according to the disclosure may be located around or in the vicinity of the centre-line of the vehicle. This localisation facilitates providing a short air path between the supply of fresh air and the ducts of the climate control system. By centre-line is meant an imaginary line passing through the centre of the vehicle and dividing it into two substantially equal parts; the centre-line runs from the front to the back of the vehicle and divides the vehicle in a left-hand half and a right-hand half.

One, two or more air supply ducts may be utilized in the vehicle.

In a preferred embodiment, the air supply duct is sealed from an engine compartment of the vehicle. Thereby no warm air can leak from the engine compartment into the air supply duct. As a result, there is a reduced need for subsequent cooling of the air supply, hence saving energy.

The present disclosure will hereinafter be further explained by means of non-limiting examples with reference to the below drawings.

It should be noted that the appended drawings are not necessarily drawn to scale and that the dimensions of some features of the present disclosure may have been exaggerated for the sake of clarity.

DETAILED DESCRIPTION

The invention will, in the following, be exemplified by embodiments. It should however be realized that the embodiments are included in order to explain principles of the invention and not to limit the scope of the invention, as defined by the appended claims. Details from two or more of the embodiments may be combined with each other.

Figure 1:
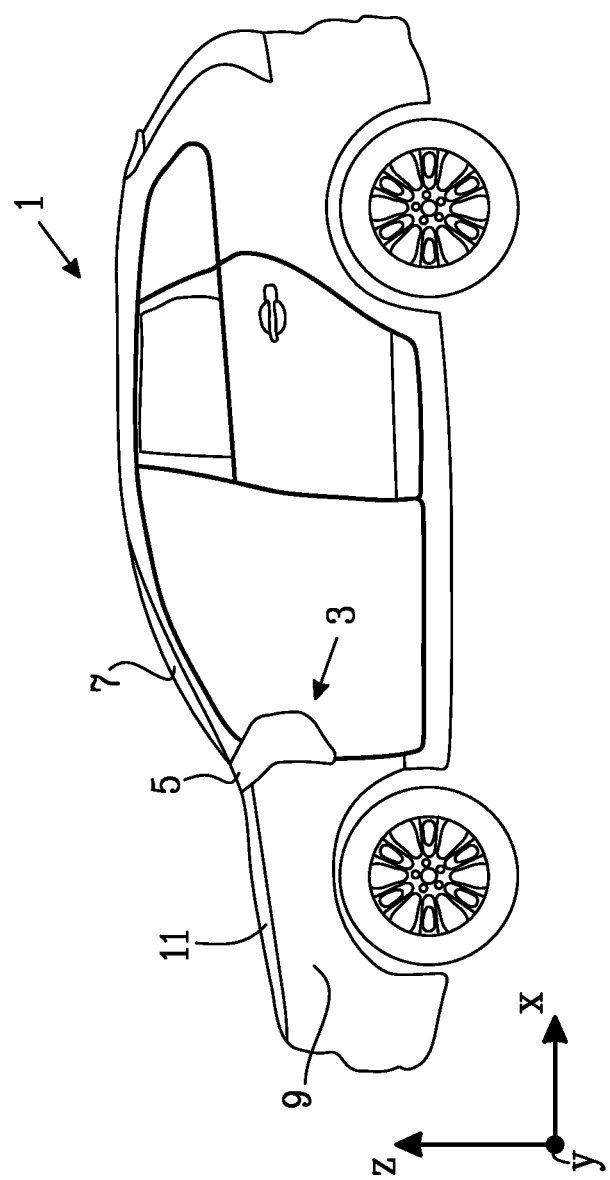
FIG. 1 is a schematic overview of a vehicle comprising an air supply duct according to the disclosure.

FIG. 1 schematically illustrates a vehicle 1 comprising an air supply duct 3 according to the disclosure. Typically, the air supply duct 3 is arranged in a region 5 between a windshield 7 and an engine compartment 9 of the vehicle. Alternatively, at least parts of the air supply duct, such as the inlet, may be arranged in a bonnet 11 of the vehicle 1.

Terms like vertical, horizontal, upper and lower used below relate to when the air supply duct according to the disclosure is mounted in a vehicle. However, the air supply duct may also be manufactured and sold as a separate unit.

Figure 2:
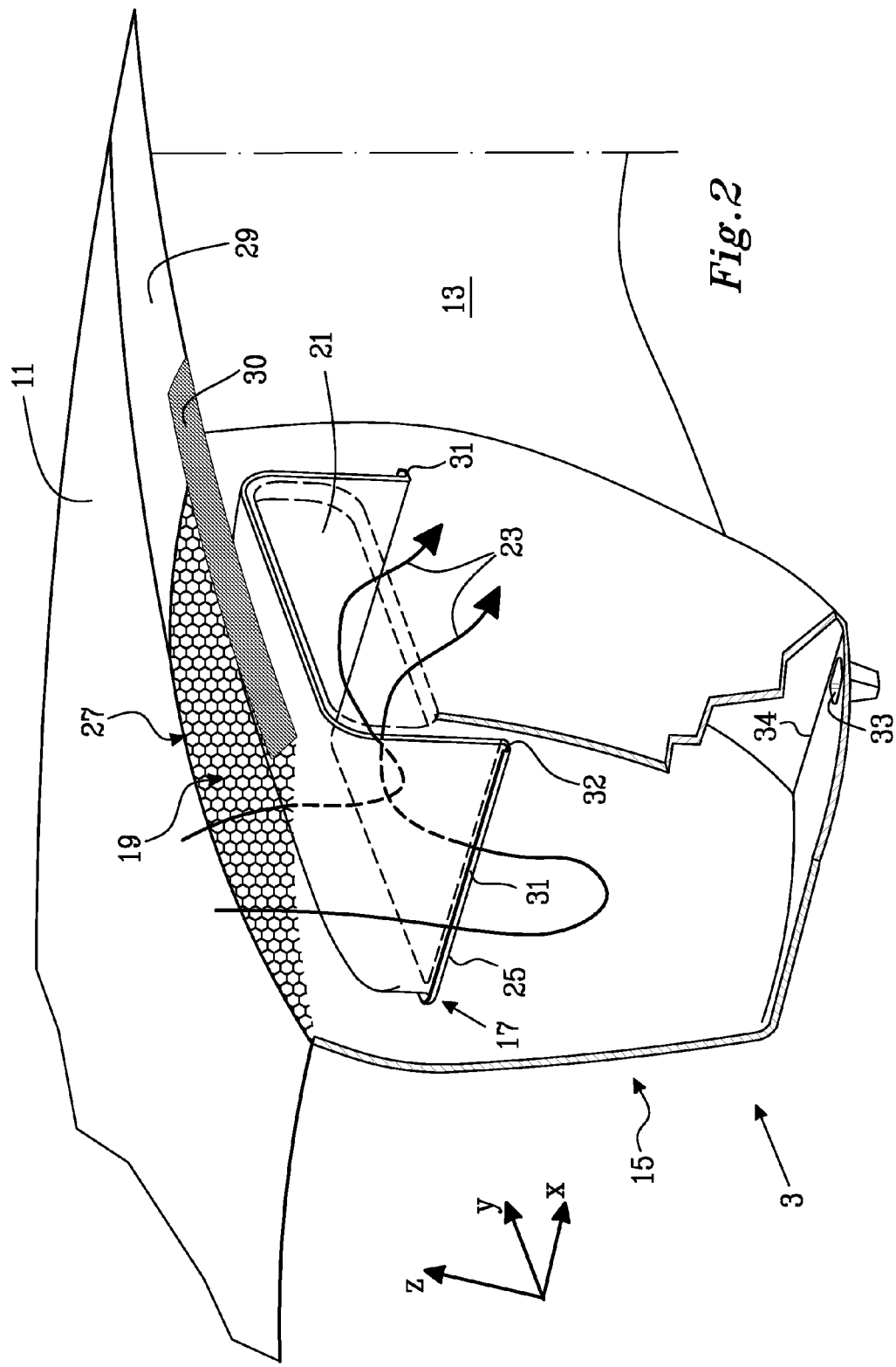
FIG. 2 is a perspective view of an air supply duct according to the disclosure seen from within a passenger compartment.

FIG. 2 illustrates the air supply duct 3 according to the disclosure in a perspective view seen from within a passenger compartment 13 of the vehicle. The air supply duct 3 comprises a housing 15 and a cowl 17 within the housing 15. The housing 15 has an inlet 19 adapted to receive air from outside of the vehicle and an outlet 21 adapted to convey the air to a climate control system (not illustrated) of the vehicle. The cowl 17 is arranged inside the housing 15 such that it can direct the air coming from the outside along an air path 23. Further, due to the cowl 17, the air path 23 changes direction within the housing 15. In the illustrated embodiment, the air path 23 changes direction by about 180 degrees when passing a lower edge 25 of the cowl 17 from essentially vertically downwards to essentially vertically upwards. Moreover, it can be seen that the cowl 17 has a curved form forming an inner curve of the air path 23. The curved form is adapted to provide an appropriate flow path for the air. Forming the inner curve means that the flow path along the cowl 17 is shorter than the flow path along walls of the housing 15, which is further explained below in conjunction with FIG. 3.

The inlet 19 is covered by a hole structure 27, in the illustrated embodiment exemplified by a perforated plate. The inlet 19 may be integrated into a windshield base panel 29, as illustrated. In such case, the housing 15 is preferably connected to the windshield base panel 29 with a tight sealing such that substantially no air can leak into the air supply duct 3 besides the air entering through the inlet 19. A water deflector 30 is also shown for preventing water flowing along the windshield from entering the inlet 19.

The cowl 17 of the air supply duct 3 comprises a precipitation collection device or means 31, in this embodiment exemplified by a gutter around the lower edge 25 of the cowl 17. The precipitation collection means 31 may be formed as an integral part of the cowl 17, as illustrated, or it may be a separate part mounted to the cowl. The precipitation collection means 31 is arranged to collect the precipitation being borne by the air passing through the air supply duct 3. The illustrated localization of the precipitation collection means 31 has been found to be beneficial, since experiments have shown that the air path 23 can be arranged to have the highest flow volume substantially along the cowl 17, which, as mentioned above, forms the inner curve. Thereby the precipitation collection means 31 may efficiently separate precipitation borne by the air from the rest of the air. Preferably, the precipitation collection means 31 is inclined in relation to a horizontal plane of the vehicle resulting in that any collected water flowing towards the lowest point 32. A drainage duct (not illustrated) may be connected to the lowest point 32 of the precipitation collection means 31.

Examples of suitable materials for the housing 15 and the cowl 17 are moulded plastics and/or metal. The choice of material is preferably made having factors such as cost, production efficiency and vehicle safety in mind.

The length of housing 15 may be between 10 and 100 centimetres, preferably between 20 and 80 centimetres and most preferably between 20 and 60 centimetres, with the length dimension of the housing 15 being in the same direction as the width dimension of the vehicle, i.e., along the y axis of FIG. 2. Further, the width of the housing 15 may be between 10 and 60 centimetres, preferably between 15 and 50 centimetres and most preferably between 20 and 40 centimetres, with the width dimension of the housing 15 being in the same direction as the length dimension of the vehicle, i.e., along the x axis of FIG. 2. Moreover, the height of the housing 15 may be between 10 and 60 centimetres, preferably between 15 and 50 centimetres and most preferably between 20 and 40 centimetres, with the height dimension being in the same direction as the height dimension of the vehicle, i.e., along the z axis of FIG. 2. The dimensions of the housing 15 make up the dimensions of the air supply duct 3.

The length of the cowl 17, in the y-direction of FIG. 2, may be between 5 and 40 centimetres, preferably between 10 and 30 centimetres. The width, in the x-direction of FIG. 2, may be between 5 and 30 centimetres, preferably between 10 and 20 centimetres. The height, in the z-direction of FIG. 2, may be between 5 and 30 centimetres, preferably between 10 and 20 centimetres. The dimensions of the outlet 21 are influenced by those of the cowl 17. The outlet 21 may extend along substantially the entire length of the cowl 17 or a part thereof. The height of the outlet 21, i.e., in the z-direction of FIG. 2, is preferably between 5 and 15 centimetres.

The precipitation collection means 31 may protrude by between 0.2 and 4 centimetres from the walls of the cowl 17, preferably by between 0.3 and 2 centimetres and most preferably between 0.5 and 1 centimetre.

Figure 3:
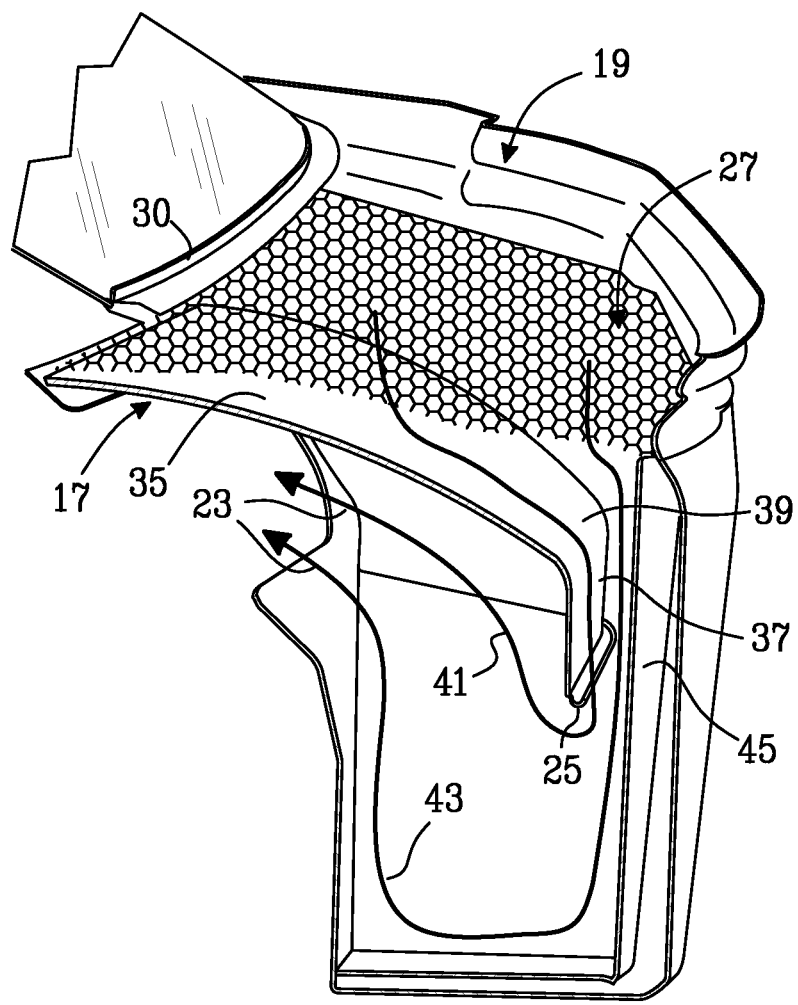
FIG. 3 is a cross-sectional side view of the air supply duct of FIG. 2.

As illustrated by FIG. 2, the housing 15 forms a separate unit which is sealed from the engine compartment of the vehicle. Thereby, no air may leak from the engine compartment into the air supply duct 3. This is beneficial from an energy point of view, since air coming from the engine compartment would, assuming a warm engine, have a higher temperature than the outside air. Therefore, in operating conditions of the climate control system, when there is a need to cool the air to provide a comfortable climate in the passenger compartment, warm air from the engine compartment would result in a need for additional cooling, which consumes energy. However, with the air supply duct 3 according to the disclosure as shown in FIGS. 2 and 3, substantially no air can leak from the engine compartment and thus such additional cooling can be avoided. In particular, the temperature level triggering the air conditioning to start may be raised by avoiding leakage of warm air into the air supply duct.

FIG. 2 further illustrates that a drainage opening 33 may be arranged at a lower region 34 of the housing 15. It is preferred that the drainage opening 33 is located at or close to the lowest point of the housing 15. Preferably, the drainage opening 33 comprises a non-return valve which is arranged to let precipitation, e.g., water, pass outwards from the air supply duct 3, but to prevent water and/or air from entering into the air supply duct 3.

FIG. 3 shows the air supply duct 3 of FIG. 2 in cross-sectional side view. The cowl 17, when seen in cross-section, has a curved form comprising a first region 35, which is substantially horizontal, and a second region 37, which is substantially vertical. In between the first region 35 and the second region 37, a transition region 39 forms a smooth transition between the first region 35 and the second region 37.

From FIG. 3 it can be seen that the air path 23 changes direction by about 180 degrees when passing the lower edge 25 of the cowl 17 from essentially vertically downwards to essentially vertically upwards. The cowl 17 forms an inner curve 41, while an outer curve 43 is formed by walls 45 of the housing 15. The flow path along the cowl 17 is thus shorter than the flow path along the walls 45 of the housing 15.

Further modifications of the disclosure within the scope of the appended claims are feasible. As such, the present invention should not be considered as limited by the exemplary embodiments and figures described herein. Rather, the full scope of the disclosure should be determined by the appended claims, with reference to the description and drawings.

What is claimed is:

1. An air supply duct for a vehicle, the air supply duct comprising:
    a housing having an inlet adapted to receive air from outside of the vehicle and an outlet adapted to convey the air to a vehicle climate control system; and
    a cowl arranged inside the housing and being adapted to direct the air along an air path such that the air path changes direction within the housing, wherein the cowl has a curved form adapted to form an inner curve of the air path, and the cowl comprises a precipitation collection device arranged to collect precipitation borne by the air from the outside of the vehicle and to remove the precipitation from the air, wherein the curved form comprises a first region that is substantially horizontal and a second region that is substantially vertical when the air supply duct is mounted in the vehicle, such that a vertical plane extending in a longitudinal direction of the vehicle extends through the first and second regions, and wherein the second region forms a front wall of the cowl, and the cowl further comprises a pair of sidewalls that extend downwardly with respect to the first region when the air supply duct is mounted in the vehicle.

2. The air supply duct according to claim 1 wherein the curved form of the cowl forms a smooth transition between the first and second regions.

3. The air supply duct according to claim 1 wherein the cowl changes the air path by about 180 degrees when passing a first edge of the cowl.

4. The air supply duct according to claim 1 further comprising a hole structure that covers the inlet.

5. The air supply duct according to claim 4 wherein the hole structure comprises at least one hole with a round, elliptic, square, rectangular, hexagonal or S-formed shape.

6. The air supply duct according to claim 1 wherein the housing has a drainage opening at a lower region, the drainage opening comprising a non-return valve.

7. The air supply duct according to claim 1 wherein the precipitation collection device is arranged along at least a portion of a first edge of the cowl.

8. The air supply duct according to claim 1 wherein the precipitation collection device forms an integral part of the cowl.

9. The air supply duct according to any claim 1 wherein the precipitation collection device forms a gutter along at least a portion of a lower edge of the cowl.

10. The air supply duct according to claim 9 wherein the cowl changes the air path by about 180 degrees when passing the lower edge of the cowl.

11. The air supply duct according to claim 1 wherein the precipitation collection device is inclined in relation to a horizontal plane when the air supply duct is mounted in the vehicle.

12. The air supply duct according to claim 1 wherein the precipitation collection device comprises a gutter that extends along a lower edge of the second region.

13. The air supply duct according to claim 1 wherein the precipitation collection device extends continuously along a lower edge of the second region and the pair of sidewalls.

14. A vehicle comprising:

a climate control system; and an air supply duct including a housing and a cowl arranged inside the housing, the housing having an inlet adapted to receive air from outside of the vehicle and an outlet adapted to convey the air to the vehicle climate control system, the cowl being adapted to direct the air along an air path such that the air path changes direction within the housing, wherein the cowl has a curved form adapted to form an inner curve of the air path, and the cowl includes a precipitation collection device arranged to collect precipitation borne by the air from the outside of the vehicle and to remove the precipitation from the air, wherein the curved form comprises a first region that is substantially horizontal and a second region that is substantially vertical, such that a vertical plane extending in a longitudinal direction of the vehicle extends the first and second regions, and wherein the second region forms a front wall of the cowl, and the cowl further comprises a pair of sidewalls extending downwardly with respect to the first region.

15. The vehicle according to claim 14 further comprising an engine compartment, wherein the air supply duct is sealed from the engine compartment.

16. The vehicle according to claim 14 wherein the precipitation collection device comprises a gutter that extends along a lower edge of the second region.

17. The vehicle according to claim 14 wherein the precipitation collection device extends continuously along a lower edge of the second region and the pair of sidewalls.

* * * * *

UNITED STATES PATENT AND TRADEMARK OFFICE
CERTIFICATE OF CORRECTION

PATENT NO. : 9,108,490 B2
APPLICATION NO. : 13/354816
DATED : August 18, 2015
INVENTOR(S) : Nathalie Bergholtz et al.

It is certified that error appears in the above-identified patent and that said Letters Patent is hereby corrected as shown below:

In the claims

Column 7, Line 29, Claim 9:

After "air supply duct according to"
Delete "any"

Column 8, Line 24, Claim 14:

After "direction of the vehicle extends"
Insert -- through --

Signed and Sealed this
Fifth Day of January, 2016

Michelle K. Lee
*Director of the United States Patent and Trademark Office*